(12) United States Patent
Angeletti et al.

(10) Patent No.: US 9,403,489 B2
(45) Date of Patent: Aug. 2, 2016

(54) VEHICLE DASHBOARD PROVIDED WITH A PORTABLE ELECTRONIC DEVICE

(71) Applicant: FCA ITALY S.p.A., Turin (IT)

(72) Inventors: Marco Angeletti, Turin (IT); Massimiliano Baudo, Turin (IT); Davide Crepaldi, Turin (IT); Carlo Lorenzano, Turin (IT)

(73) Assignee: FCA ITALY S.p.A., Turin (IT)

( * ) Notice: Subject to any disclaimer, the term of this patent is extended or adjusted under 35 U.S.C. 154(b) by 0 days.

(21) Appl. No.: 14/721,741

(22) Filed: May 26, 2015

(65) Prior Publication Data
US 2015/0343963 A1    Dec. 3, 2015

(30) Foreign Application Priority Data

May 28, 2014  (IT) .............................. TO2014A0427

(51) Int. Cl.
*B60R 11/00*  (2006.01)
*B60R 11/02*  (2006.01)

(52) U.S. Cl.
CPC ......... *B60R 11/0235* (2013.01); *B60R 11/0241* (2013.01); *B60R 11/0252* (2013.01); *B60R 11/0258* (2013.01); *B60R 2011/0005* (2013.01); *B60R 2011/0047* (2013.01); *B60R 2011/0075* (2013.01); *B60R 2011/0082* (2013.01); *B60R 2011/0087* (2013.01); *B60R 2011/0092* (2013.01)

(58) Field of Classification Search
CPC ............ B60R 11/0235; B60R 11/0252; B60R 11/0258
USPC ...................................................... 296/37.12
See application file for complete search history.

(56) References Cited

U.S. PATENT DOCUMENTS 5,996,866 A * 12/1999 Susko ................. B60R 11/0241
224/281
2010/0124005 A1    5/2010  Hotary et al.

FOREIGN PATENT DOCUMENTS

| DE | 102005021105 A1 | 11/2006 |
| DE | 10 2011 109056 A1 | 1/2013 |
| EP | 950272 A3 | 6/2000 |
| WO | 02/085672 A1 | 10/2002 |

* cited by examiner

*Primary Examiner* — Joseph D Pape
(74) *Attorney, Agent, or Firm* — Sutherland Asbill & Brennan LLP

(57) ABSTRACT

A vehicle dashboard has a fixed structure provided with an outer surface, facing a passenger compartment, and a housing having an opening at said outer surface; the dashboard further has a supporting device provided with a frame, which has a seat for supporting a portable electronic device and is movable between an operative position, in the passenger compartment, and a stowed position, in the housing; the dashboard has a blocking device for retaining the frame in the stowed position; the blocking device is activated/deactivated automatically in response to a signal which is indicative of an authorized closing/opening control executed to close/open the lock of at least one of the side doors of the vehicle.

8 Claims, 2 Drawing Sheets

VEHICLE DASHBOARD PROVIDED WITH A PORTABLE ELECTRONIC DEVICE

CROSS-REFERENCE TO RELATED APPLICATIONS

This application claims priority under 35 U.S.C. 119(a) to Italian Application TO2014A000427 filed May 28, 2014, the subject matter of which is expressly incorporated herein by reference in its entirety.

The present invention relates to a vehicle dashboard provided with a supporting device for supporting a portable electronic device, in particular a portable electronic device with a touchscreen.

BACKGROUND OF THE INVENTION

Portable electronic devices, such as satellite navigation systems, tablets and mobile phones, in particular those provided with a touchscreen, are very popular and are used on vehicles as well.

In many solutions, such devices are coupled to a support which, in turn, is attached to the vehicle windscreen by means of a suction cup in such a position to easily tap the touchscreen and thus control the various functions. This type of suction cup coupling, however, is subjected to undesired releasing and may compromise the external visibility through the windscreen.

DE102005021105 corresponds to the preamble of claim 1 and describes a frame fixed to the dashboard of a motor vehicle and having a fixed housing, which is configured so as to be able to insert a portable electronic device therein. Also this solution is poorly satisfactory, in particular as regards the relatively bulky dimensions of the said frame and due to the poor safety against possible breaking and entering attempts aimed at extracting the device from the housing.

SUMMARY OF THE INVENTION

The object of the present invention is to provide a vehicle dashboard provided with a supporting device for supporting a portable electronic device, which allows solving the above drawbacks in a simple and cost-effective manner and allows integrating such supporting device directly in the vehicle dashboard without overly compromising the aesthetics and the structural features of the dashboard itself.

According to the present invention, a vehicle dashboard is made, which is provided with a supporting device for supporting a portable electronic device, as defined by claim 1.

BRIEF DESCRIPTION OF THE DRAWINGS

The invention will now be described with reference to the accompanying drawings, which show a non-limiting example thereof, in which.

DETAILED DESCRIPTION OF THE INVENTION

Figure 1:
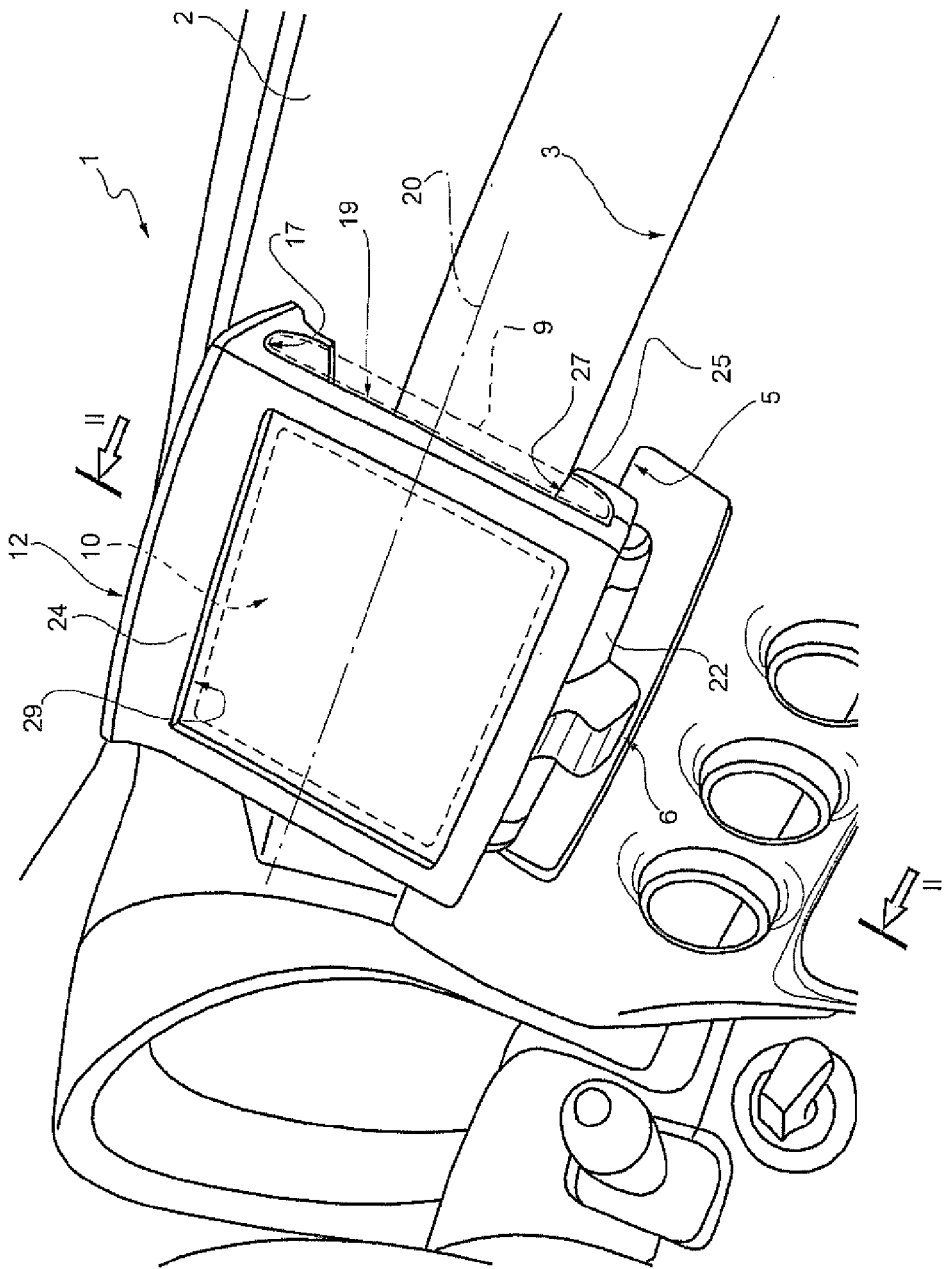
FIG. 1 shows a perspective view of a preferred embodiment of the vehicle dashboard provided with a supporting device for supporting a portable electronic device, according to the present invention.

In FIG. 1, reference numeral 1 indicates, as a whole, a vehicle dashboard (partially shown) comprising a structure 2 made of plastic material and having an outer surface 3 facing a passenger compartment of the vehicle.

Dashboard 1 has a housing 4 (FIG. 2) provided, at surface 3, with an opening 5 and it comprises a supporting device 6 for supporting a portable electronic device 9 (shown with a dashed line). Device 9, in particular, has a touchscreen 10. In the accompanying figures, device 9 is represented by a tablet.

Device 6 comprises a frame 12 shaped so as to define a pocket 17 having such a shape and dimensions to accommodate device 9. Along a side of frame 12, pocket 17 has a side opening 19 which allows a user to insert/extract device 9 with respect to pocket 17 along a horizontal axis 20. The dimensions of pocket 17 are such to substantially match those of device 9, whereby frame 12 defines a guide for guiding device 9 along axis 20 during the insertion/extraction and defines a retention system, for example by friction, for retaining device 9 in fixed position into pocket 17.

Frame 12 has a substantially rectangular perimeter and comprises two end portions 21, 22 substantially parallel to axis 20; a front wall 24; and a back wall 25 facing each other, and a side wall 26 opposite to opening 19.

Advantageously, wall 25 has a recess 27 at opening 19 to facilitate the gripping and thereby the extraction of device 9 from pocket 17. Preferably, wall 24 defines a rectangular window 29 which is arranged at screen 10 of device 9, in use. According to a variant not shown, window 29 may be closed by a transparent element, such as a film having such features to adhere to screen 10 when device 9 is housed into pocket 17.

Figure 2:
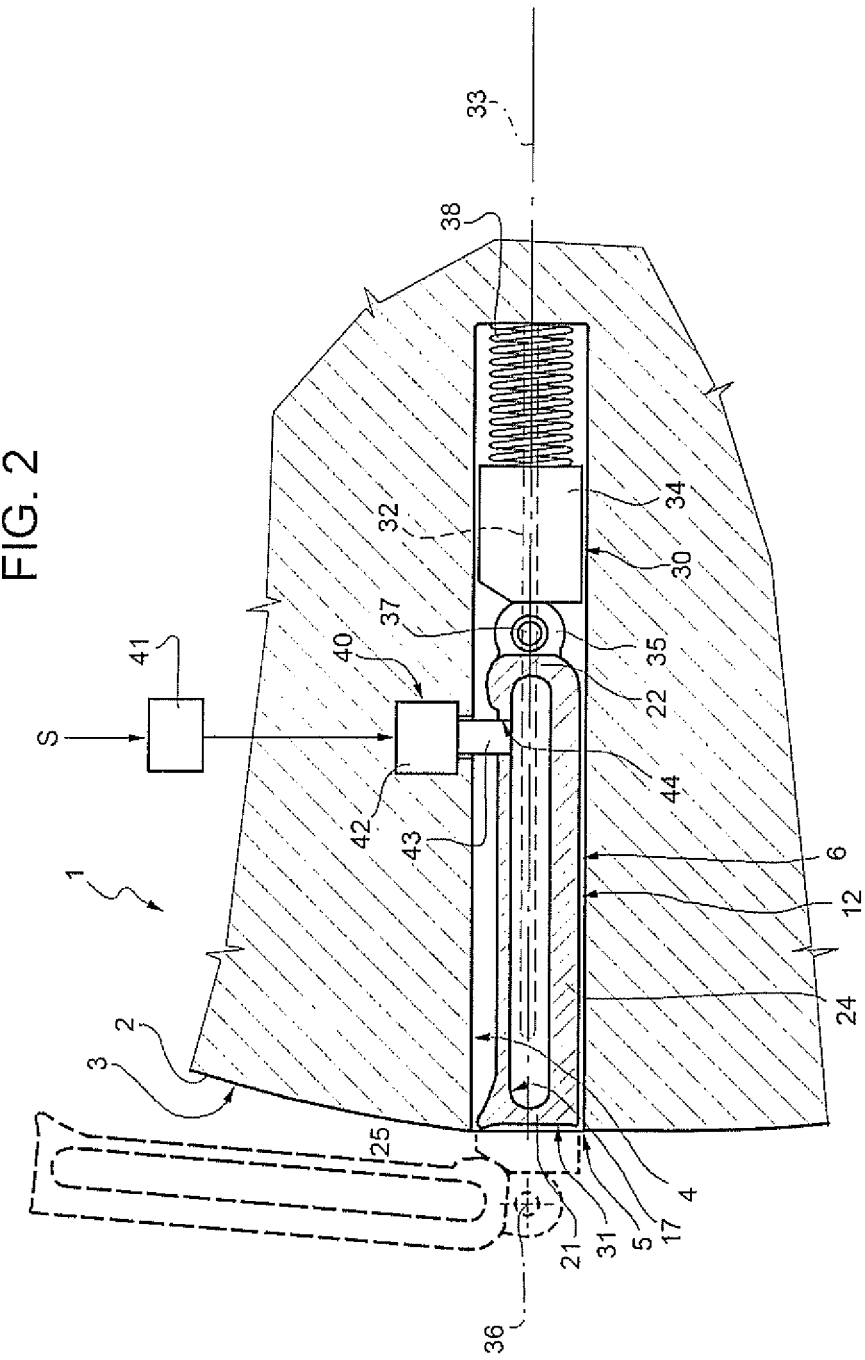
FIG. 2 is a diagram showing the dashboard of the present invention, in section according to the vertical section plane indicated as II-II in FIG. 1.

With reference to that schematically shown in FIG. 2, device 6 comprises a moving mechanism 30 to allow the user to move frame 12 between a stowed position (shown with a continuous line) and an extracted operative position (indicated with a dashed line and substantially corresponding to that shown in FIG. 1).

In the closed stowed position, frame 12 is stowed into housing 4, while portion 21 closes opening 5 and has a surface 31 which extends substantially flush with surface 3. In the extracted operative position, on the other hand, window 29 is arranged outside of housing 4 and faces towards the driving position or towards the center of the passenger compartment, advantageously with a slight inclination upwards and forwards, i.e. towards the vehicle windscreen, to facilitate the reading and/or control of screen 10.

Mechanism 30 comprises a guide 32 (schematically shown with a dashed line) arranged in a fixed position within structure 2 and defining a sliding axis 33, along which frame 12 moves in part of its trajectory between the stowed position and the operative position.

Mechanism 30 also comprises a slide 34, coupled to guide 32 so as to slide along axis 33; and a hinge 35, which couples an end of slide 34 to portion 22 to allow a rotation of frame 12 about an axis 36 parallel to axis 20.

When it is outside housing 4, therefore, frame 12 can rotate between a first angular position, in which it is aligned with slide 34 along axis 33 to enter/exit with respect to housing 4; and a second angular position, in which frame 12 is inclined with respect to slide 34 and arranged in the operative position.

In particular, mechanism 30 comprises a spring device 37 which is preferably integrated with hinge 35 and is preloaded so as to automatically rotate frame 12 in the second angular position, while the return to the first angular position is to be performed manually by the user. End stroke abutments may be provided on slide 34 and/or on hinge 35 to define the first and the second angular position of frame 12.

According to a variant not shown, mechanism 30 is devoid of hinge 35, therefore frame 12 is coupled to guide 32 to slide between the closed stowed position and the extracted operative position through a single translation movement, without any rotation (in this case, axis 33 is substantially vertical and/or defines a curved trajectory, instead of being straight).

Preferably, mechanism 30 comprises at least an elastic element 38, which is preloaded so as to automatically push slide 34 and/or frame 12 outwards of housing 4 along axis 33. Preferably, a retaining device (not shown) retains frame 12 in the closed stowed position against the elastic action of element 38 and can be released by a manual control by the user when the latter wants to extract frame 12 in the operative position. The return to the stowed position in housing 4 is executed by the user by manually pushing frame 12 along axis 33, By way of example, mechanism 30 is of the "push-pull" or "push-push" type. According to an alternative not shown, mechanism 30 comprises an electric motor controlled by the user to move frame 12 between the operative and the stowed positions.

According to the invention, dashboard 1 further comprises a lock or a blocking device 40, which is configured so as to retain frame 12 into housing 4 and is activated/deactivated automatically by an electronic control and command unit 41 in response to a signal S, which is indicative of an authorized closing/opening control aimed to close/open at least one of the side doors (not shown) of the vehicle.

The terms "authorized closing/opening control" mean any of the following events:
- a manual closing/opening action executed by an authorized key;
- the manual operation of a remote control that is associated to the vehicle locks and controls such locks at a distance (the so-called "central locking/opening");
- the automatic opening control caused by the remote recognition of an electronic badge or a similar identification device carried by the driver or by another user.

Preferably, signal S is transmitted to unit 41 by the CAN (Controller Area Network) line of the vehicle.

In particular, the blocking device 40 comprises an electric motor 42 controlled by unit 41 and at least one stop latch or tooth 43, which is operated by motor 42 to move between a locking position, in which it prevents frame 12 from exiting from housing 4, and a releasing position, in which it leaves frame 12 free to move through opening 5. In the locking position, the stop tooth 43 is interposed, in a direction parallel to axis 33, between opening 5 and an abutment 44, which is defined by an edge of frame 12 and faces towards opening 5 itself. Preferably, in the locking position the stop tooth 43 is already in contact with abutment 44 so as to prevent any exit movement of frame 12 from housing 4.

Abutment 44 is advantageously defined by an edge of wall 25, as shown in FIG. 2. In general, abutment 44 is defined by the edge of an opening made in frame 12 at the position of the stop tooth 43. According to an alternative not shown, abutment 44 is defined by an edge of slide 34, instead of being defined by frame 12.

It is clear from the foregoing that the blocking device 40 defines an antitheft device that is activated/deactivated automatically in response to the closing and opening of the side doors. In other words, in case of breaking of the doors by unauthorized users, the blocking device 40 prevents the theft of device 9 when the latter is left by the user in pocket 17, with frame 12 arranged in the stowed position within structure 2.

At the same time, the possibility of storing frame 12 and thus pocket 17 into housing 4, for example during the stops of the vehicle, allows maintaining the aesthetic features of structure 2 of dashboard 1 unchanged and concealing device 9 to the view from outside the vehicle.

In addition to being perfectly integrated in dashboard 1, the supporting device 6 retains device 9 in a fixed position, in a stable manner, thanks to the pocket configuration. At the same time, the operations for inserting and extracting device 9 are relatively simple.

The configuration with slide 34 and hinge 35 allows, with an extremely simple movement, frame 12 to be brought to an operative position which is relatively ergonomic for the driver, and to a stowed position in which device 6 has small overall dimensions.

Finally, from the foregoing it is clear that dashboard 1 described can be subjected to modifications and variants not departing from the scope of protection of the present invention.

For example, the supporting device 6 may have one or more adaptation masks to also accommodate smaller portable electronic devices than the actual size of pocket 17 into frame 12.

Moreover, frame 12 may have a seat shaped differently from pocket 17 to accommodate the support device 9; and/or device 6 may be configured so as to support a device other than the tablet, namely a mobile phone, a satellite navigator, or any other type of portable electronic device that is of a size compatible with pocket 17.

The invention claimed is:

1. A vehicle dashboard comprising:
   a fixed structure having an outer surface facing, in use, a passenger compartment of the vehicle; and
   a supporting device comprising a frame having a seat for supporting a portable electronic device;
   characterized in that said fixed structure has a housing provided with an opening at said outer surface, and characterized by further comprising:
   moving means for moving said frame between a stowed position, in which said frame is concealed in said housing and has an end portion arranged to close said opening; and an operative position, in which said frame is arranged outside said housing;
   blocking means for retaining said frame in the stowed position;
   control means configured so as to activate and deactivate said blocking means automatically in response to a signal which is indicative of an authorized closing and opening control, executed to close and open a lock of at least one of the side doors of the vehicle.

2. A dashboard according to claim 1, characterized in that said blocking means comprise an electric motor and a stop tooth, which is actuated by said electric motor to move between a locking position, in which said stop tooth is arranged between said opening and an abutment of said frame when said frame is arranged in the stowed position, and a releasing position in which said frame is free to move through said opening.

3. A dashboard according to claim 2, characterized in that, in the locking position, said stop tooth is in contact with said abutment.

4. A dashboard according to claim 1, characterized in that said seat is defined by a pocket provided with a side opening for inserting and extracting said portable electronic device along a horizontal axis; said frame comprising a front wall defining a window, which when in use, is positioned at a screen of said portable electronic device.

5. A dashboard according to claim 1, characterized in that said moving means comprise:
   guiding means defining at least a part of a trajectory of said frame which extends between the stowed position and the operative position; and ejection means for transferring said frame into the operative position.

6. A dashboard according to claim 5, characterized in that said ejection means comprise at least one elastic element, and characterized by comprising a blocking means, which are adapted to retain said frame in the stowed position against the bias of said elastic element and are manually releasable in response to a control by a user.

7. A dashboard according to claim 5, characterized in that said moving means further comprise:
- a slide coupled to said guiding means in sliding manner; and
- a hinge, which couples one end of said slide to an end of said frame to allow a rotation of said frame about a horizontal hinge axis.

8. A dashboard according to claim 7, characterized in that said moving means further comprise:
- end stroke means defining at least one angular position of said frame with respect to said slide; and
- elastic means preloaded so as to make said frame automatically rotate about said horizontal hinge axis into said angular position.

* * * * *